United States Patent [19]
Nankou

[11] Patent Number: 6,117,032
[45] Date of Patent: Sep. 12, 2000

[54] PROTECTIVE PLATE FOR BICYCLE CHAIN

[75] Inventor: Yoshiaki Nankou, Sakai, Japan

[73] Assignee: Shimano, Inc., Osaka, Japan

[21] Appl. No.: 09/023,821

[22] Filed: Feb. 13, 1998

[51] Int. Cl.[7] .............................. F16H 9/00; F16H 59/00
[52] U.S. Cl. ................................................ 474/80; 474/69
[58] Field of Search ................................ 474/78, 79, 80, 474/81, 82, 140, 144

[56] References Cited

U.S. PATENT DOCUMENTS

| | | | |
|---|---|---|---|
| 4,330,137 | 5/1982 | Nagano | 280/238 |
| 4,337,933 | 7/1982 | Egami | 269/40 |
| 5,496,222 | 3/1996 | Kojima et al. | 474/80 |
| 5,620,384 | 4/1997 | Kojima et al. | 474/82 |
| 5,728,018 | 3/1998 | Terada et al. | 474/80 |
| 5,846,148 | 12/1998 | Fujii | 474/80 |

FOREIGN PATENT DOCUMENTS

| | | | |
|---|---|---|---|
| 653347 A1 | 5/1995 | European Pat. Off. | |
| 8-324480 | 12/1996 | Japan | |

*Primary Examiner*—David A. Bucci
*Assistant Examiner*—Matthew A. Kaness
*Attorney, Agent, or Firm*—James A. Deland

[57] ABSTRACT

A protective plate for attachment to a bicycle frame for guiding a chain includes a plate body having a first side for facing laterally toward the bicycle frame, a second side for facing laterally away from the bicycle frame, a lower portion, and an upper portion. The lower portion of the first side of the plate body is structured to align with a bottom bracket of the bicycle, and a positioning abutment member is disposed on the upper portion of the first side of the support body. An upper surface of the positioning abutment member forms a positioning abutment for positioning a front derailleur to the bicycle frame. Additionally, a chain guiding abutment may be formed on the upper portion of the second side of the support body for guiding the chain as the chain shifts from a larger chainring to a smaller chainring.

24 Claims, 4 Drawing Sheets

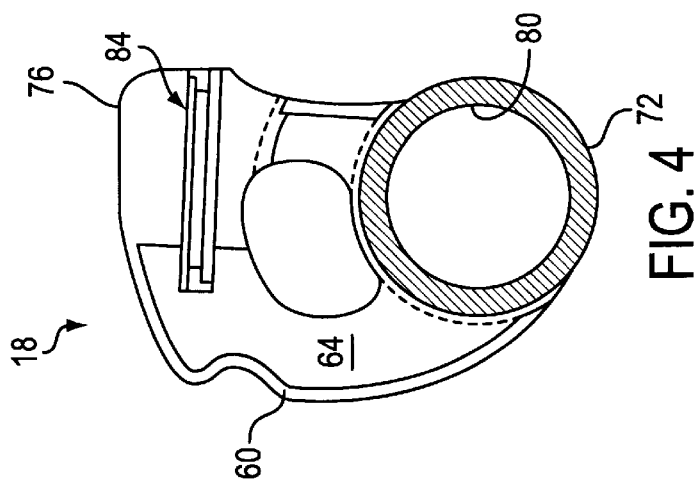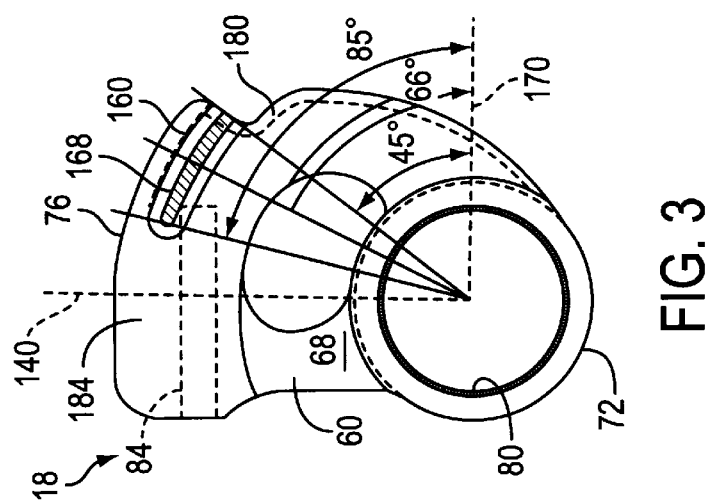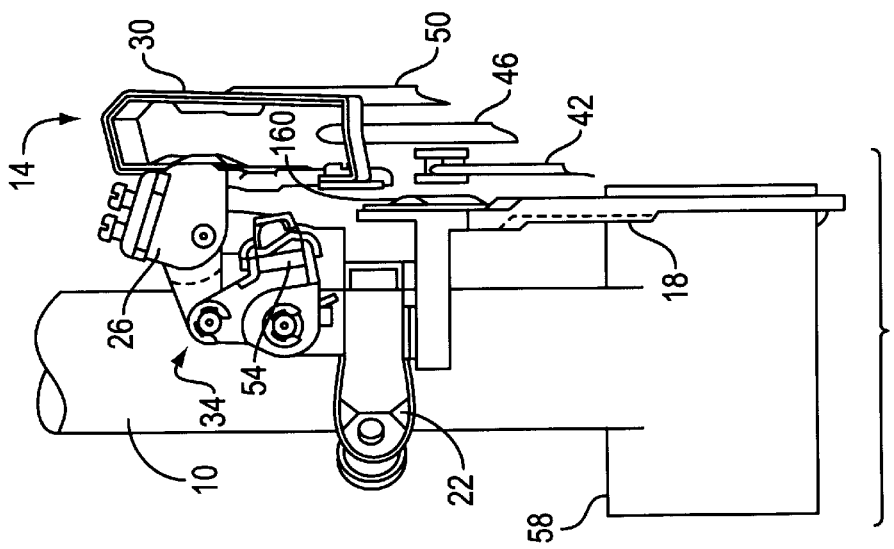

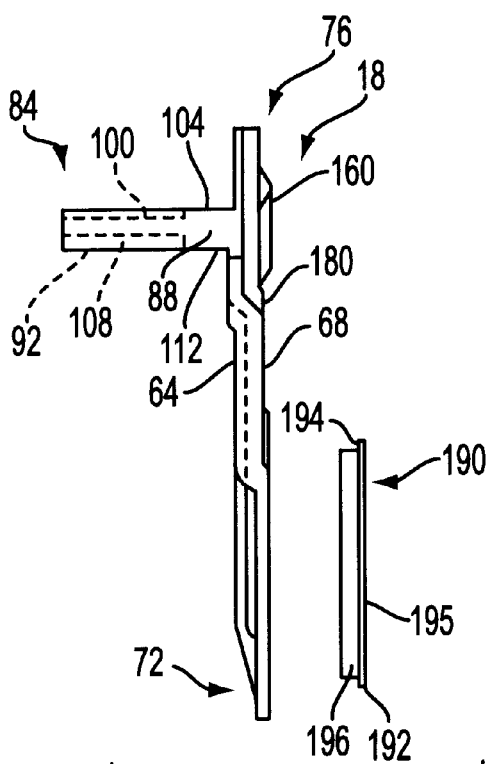
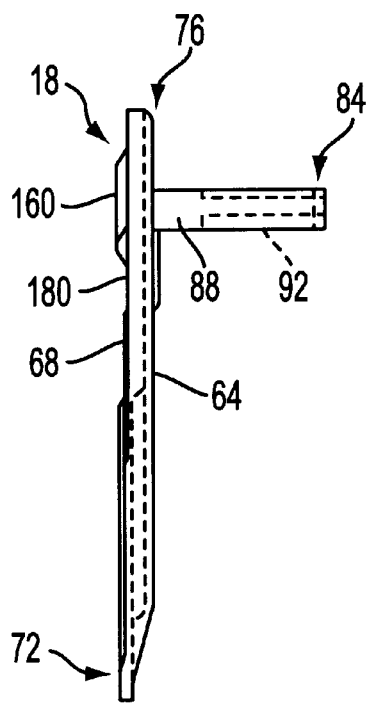
FIG. 5
FIG. 6
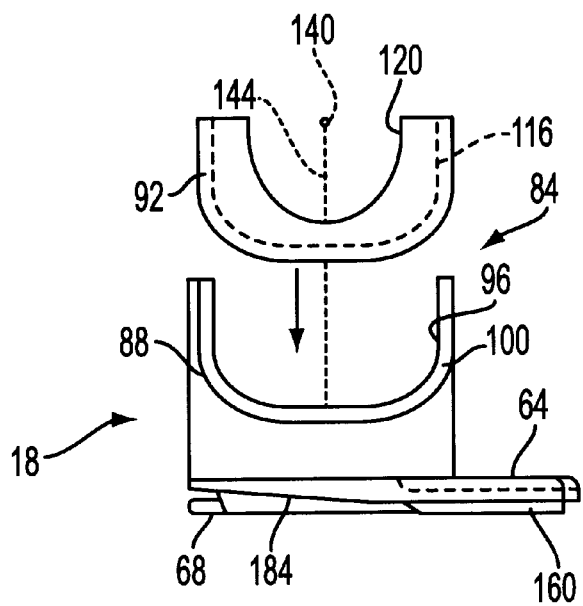
FIG. 7

PROTECTIVE PLATE FOR BICYCLE CHAIN

BACKGROUND OF THE INVENTION

The present invention is directed to a protective plate for a bicycle chain and, more particularly, to a protective plate that is mounted near the front derailleur of the bicycle to prevent the chain from falling from the large sprocket and which is capable of positioning the front derailleur on the frame.

Some bicycles are equipped with three front chainrings connected to the front pedals and a plurality of rear sprockets attached to the rear wheel of the bicycle. A chain is connected between a selected front chainring and a selected rear sprocket to provide driving force from the pedals to the rear wheel. A front derailleur is used to position the chain on the selected front chainring, and a rear derailleur is used to position the chain on the selected rear sprocket. The various combinations of front and rear sprockets provide a wide range of gear ratios to accommodate a wide range of riding conditions.

If the front derailleur is not adjusted properly, there is a risk that the chain will fall from the smallest chainring when the chain is being shifted from the middle chainring to the smallest chainring. As a result, the chain often jams between the smallest sprocket and the bicycle frame, thus requiring the rider to dismount the bicycle and reattach the chain to the sprocket. Since the chain often jams between the smallest sprocket and the bicycle frame with much force, unjamming the chain can be very difficult. Thus, it is desirable to prevent such jamming if possible.

Adjusting the front derailleur includes properly setting the vertical position of the front derailleur on the seat tube. This can prove very difficult and time consuming, since very close tolerances are usually required for proper operation. As a result, the front derailleur frequently is not positioned correctly.

SUMMARY OF THE INVENTION

The present invention is directed to a protective plate which mounts to a bicycle frame between the large chainring and the bicycle frame for positioning the front derailleur on the bicycle frame and for guiding the chain as the chain shifts from a larger sprocket to a smaller sprocket so that the chain does not fall from the smaller sprocket.

In one embodiment of the present invention, a protective plate for attachment to a bicycle frame for guiding a chain includes a plate body having a first side for facing laterally toward the bicycle frame, a second side for facing laterally away from the bicycle frame, a lower portion, and an upper portion. The lower portion of the first side of the plate body is structured to align with a bottom bracket of the bicycle, and a positioning abutment member is disposed on the upper portion of the first side of the support body. An upper surface of the positioning abutment member forms a positioning abutment for positioning a front derailleur to the bicycle frame. Additionally, a chain guiding abutment may be formed on the upper portion of the second side of the support body for guiding the chain as the chain shifts from a larger chainring to a smaller chainring.

In a more specific embodiment, the positioning abutment member forms a frame positioning member for positioning the plate body on the bicycle frame, and the lower portion of the plate body defines a bottom bracket opening. The chain guiding abutment has an arcuate shape and is disposed at an angle of from approximately 45° to approximately 85°, and more specifically approximately 66°, from a horizontal axis.

BRIEF DESCRIPTION OF THE DRAWINGS

FIG. 2 is a rear view of the bicycle frame, front derailleur and protective plate shown in FIG. 1;

FIG. 3 is a right side view of the protective plate shown in FIGS. 1 and 2;

FIG. 4 is a left side view of the protective plate shown in FIGS. 1 and 2;

FIG. 5 is a rear view of the protective plate shown in FIGS. 1 and 2;

FIG. 6 is a front view of the protective plate shown in FIGS. 1 and 2;

FIG. 7 is a top view of the protective plate shown in FIGS. 1 and 2; and

DETAILED DESCRIPTION OF THE EMBODIMENTS

Figure 1:
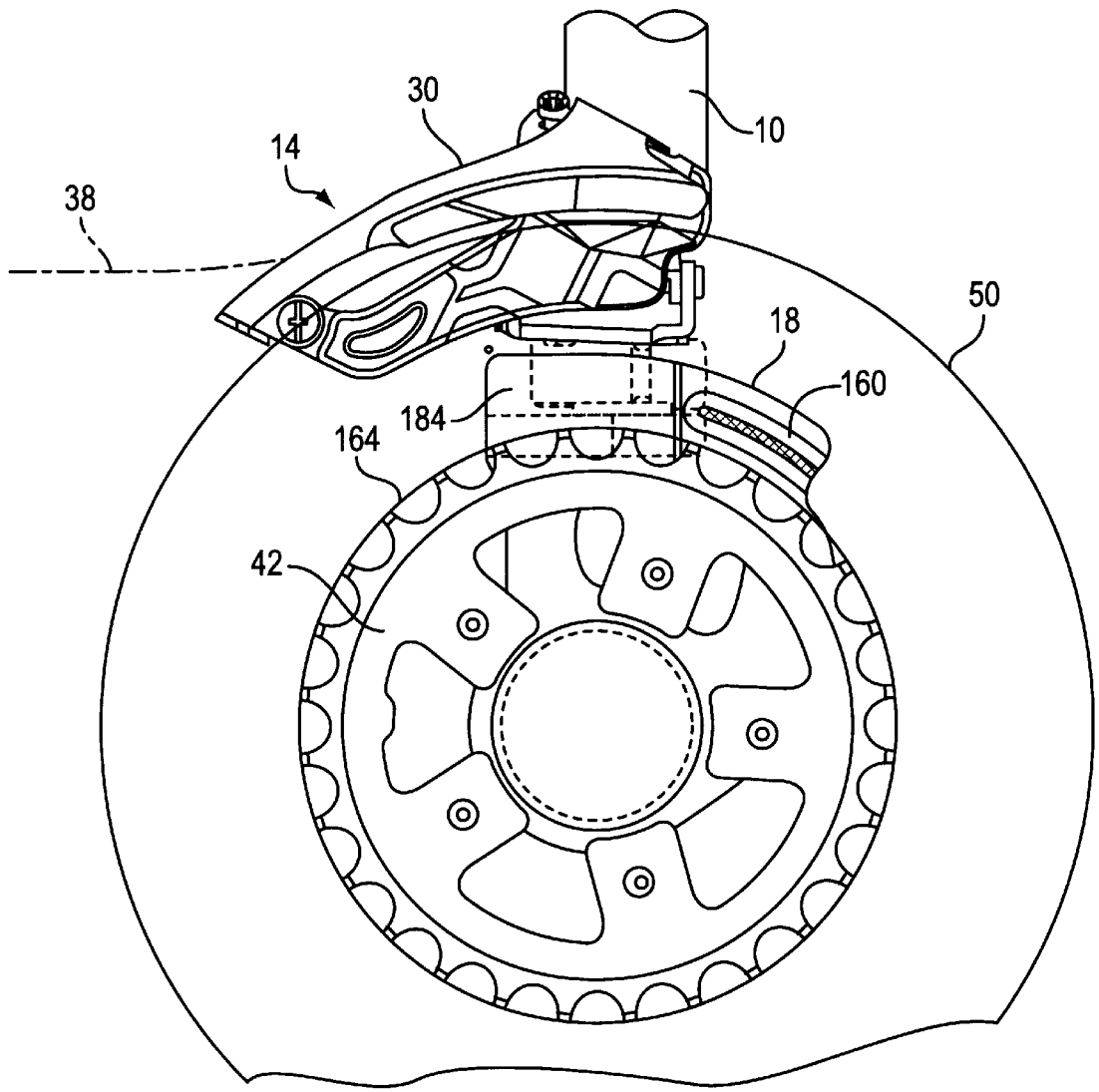
FIG. 1 is a side view of a portion of a bicycle frame on which is mounted a front derailleur and a particular embodiment of a protective plate according to the present invention.

FIG. 1 is a side view of a portion of a bicycle frame 10 on which is mounted a front derailleur 14 and a particular embodiment of a protective plate 18 according to the present invention, and FIG. 2 is a rear view of the bicycle frame 10, front derailleur 14 and protective plate 18 shown in FIG. 1. Front derailleur 14 includes a base member 22 for mounting front derailleur 14 to bicycle frame 10, a movable member 26 supporting a chain guide 30, and a linkage mechanism 34 for coupling movable member 26 to base member 22 so that chain guide 30 can guide a chain 38 among a small chainring 42, a middle chainring 46 and a large chainring 50 in response to tension applied by a derailleur cable (not shown) to an actuating arm 54.

If front derailleur 14 is not adjusted properly, there is a risk that chain 38 falls from small sprocket 42 when front derailleur 14 shifts chain 38 from middle sprocket 46 to small sprocket 42. When this happens, sometimes chain 38 usually jams between small sprocket 42 and frame 10, particularly between small sprocket 42 and a bottom bracket 58. To prevent this from happening, protective plate 18 is mounted to frame 10 between small sprocket 42 and frame 10, and more specifically between small sprocket 42 and bottom bracket 58.

As shown in FIGS. 3–7, protective plate 18 includes a support body in the form of a plate body 60 having a first side 64 for facing laterally toward the bicycle frame 10, a second side 68 for facing laterally away from the bicycle frame, a lower portion 72 and an upper portion 76. Plate body 60 may be formed from plastic, fiberglass, aluminum, steel, etc. As used herein, the terms "laterally toward the bicycle," "laterally away from the bicycle," "upper," and "lower" are to be determined from FIG. 2, and the terms "forward," "front," "rear," and "back" are to be determined from FIG. 1 where the forward or front direction is toward the right in FIG. 1, and the rear or back direction is toward the left in FIG. 1.

The lower portion 72 of the plate body 60 has a bottom bracket opening 80 that aligns with bottom bracket 58. In this embodiment, bottom bracket opening 80 has the same diameter as the corresponding opening (not shown) in bottom bracket 58 of the bicycle. In any event, the first side 64 of the lower portion 72 of plate body 60 aligns with bottom bracket 58 when protective plate 18 is mounted to bicycle frame 10.

A frame positioning member 84 is disposed on the upper portion 76 of the first side 64 of plate body 76 for positioning plate body 76 on bicycle frame 10. In this embodiment, as shown more clearly in FIG. 7, positioning member 84 includes a positioning abutment member 88 and a positioning buffer 92. Positioning abutment member 88 is formed as one piece with plate body 60 and extends laterally inwardly at a right angle to first side 64. Positioning abutment member 88 includes a concave semicircular surface 96, an upper groove 100 extending along an upper surface 104 adjacent to concave surface 96, and a lower groove 108 extending along a lower surface 112 adjacent to concave surface 96. Positioning buffer 92 includes a groove 116 for mounting positioning buffer 92 to positioning abutment member 88 and a concave semicircular surface 120 for abutting against frame 10. Thus, concave surface 120 nonrotatably positions plate body 60 on frame 10. Positioning buffer 92 may be formed from plastic or rubber to prevent plate body 60 from scratching frame 10.

When plate body 60 is positioned on bicycle frame 10, upper surface 104 of positioning abutment member 88 may act as a positioning abutment which abuts against base member 22 of front derailleur 14 for setting the proper vertical height of front derailleur 14. The distance between the center of bottom bracket opening 80 and upper surface 104 may be from 45 millimeters to 75 millimeters depending upon the type of front derailleur and chainrings used. For example, the distance between the center of the bottom bracket opening 80 and the upper surface 104 should be approximately 71.5 millimeters when a front derailleur with an aluminum base member 22 is used with a large chainring having 48 teeth. The distance between the center of the bottom bracket opening 80 and the upper surface 104 should be approximately 47.8 millimeters when a front derailleur with a steel base member 22 is used with a large chainring having 42 teeth.

As shown in FIG. 7, the concave surface 120 of positioning buffer 92 (or concave surface 96 of positioning abutment member 88 if positioning buffer 92 is not used) is centered on a vertical axis 140 that intersects the center of bottom bracket opening 80 (FIG. 3). Additionally, concave surfaces 96 and 120 are symmetrical relative to a vertical plane 144 extending from the vertical axis 140 to the center of each concave surface. As used herein, the vertical axis ordinarily coincides with the seat tube and, as such, is not necessarily exactly vertical.

A chain guiding abutment 160 is formed as one piece on the upper portion 76 of the second surface 68 of plate body 60 for guiding the chain 38 to small sprocket 42 and preventing chain 38 from falling off small sprocket 42 when chain 38 is being shifted from middle sprocket 46 to small sprocket 42. As shown in FIG. 1, chain guiding abutment 160 is positioned above the circle 164 defined by the teeth of small sprocket 42 and, as shown in FIG. 3, has an arcuate shape centered on the center of bottom bracket opening 80. In this embodiment, the radial position of chain guiding abutment 160 is approximately 6.0 millimeters and preferably 6.4 millimeters from circle 164. Also, as shown in FIG. 3, the laterally outermost edge 168 of abutment 160 extends from approximately 45° to approximately 85° counterclockwise from a horizontal axis 170 that is perpendicular to vertical axis 140 and that intersects the center of bottom bracket opening 80. Chain guiding abutment 160 preferably has a portion disposed at least at approximately 66° counterclockwise from horizontal axis 170.

A lower recess 180 is formed on the second side 68 of plate body 60 beneath chain guide abutment 160 and approximately follows the path of the teeth of small sprocket 42 as shown in FIG. 1. Lower recess 180 helps to prevent chain 38 from rubbing against plate body 60 when chain 38 meshes with small sprocket 42. Additionally, a rear recess 184 is disposed adjacent to and in back of chain guiding abutment 160 for preventing chain 38 from rubbing against plate body 60. In this embodiment, rear recess 184 has a tapered shape which tapers laterally inwardly from the rear of chain guiding abutment 160 to the rear edge of plate body 60 as shown more clearly in FIG. 7.

Figure 8:
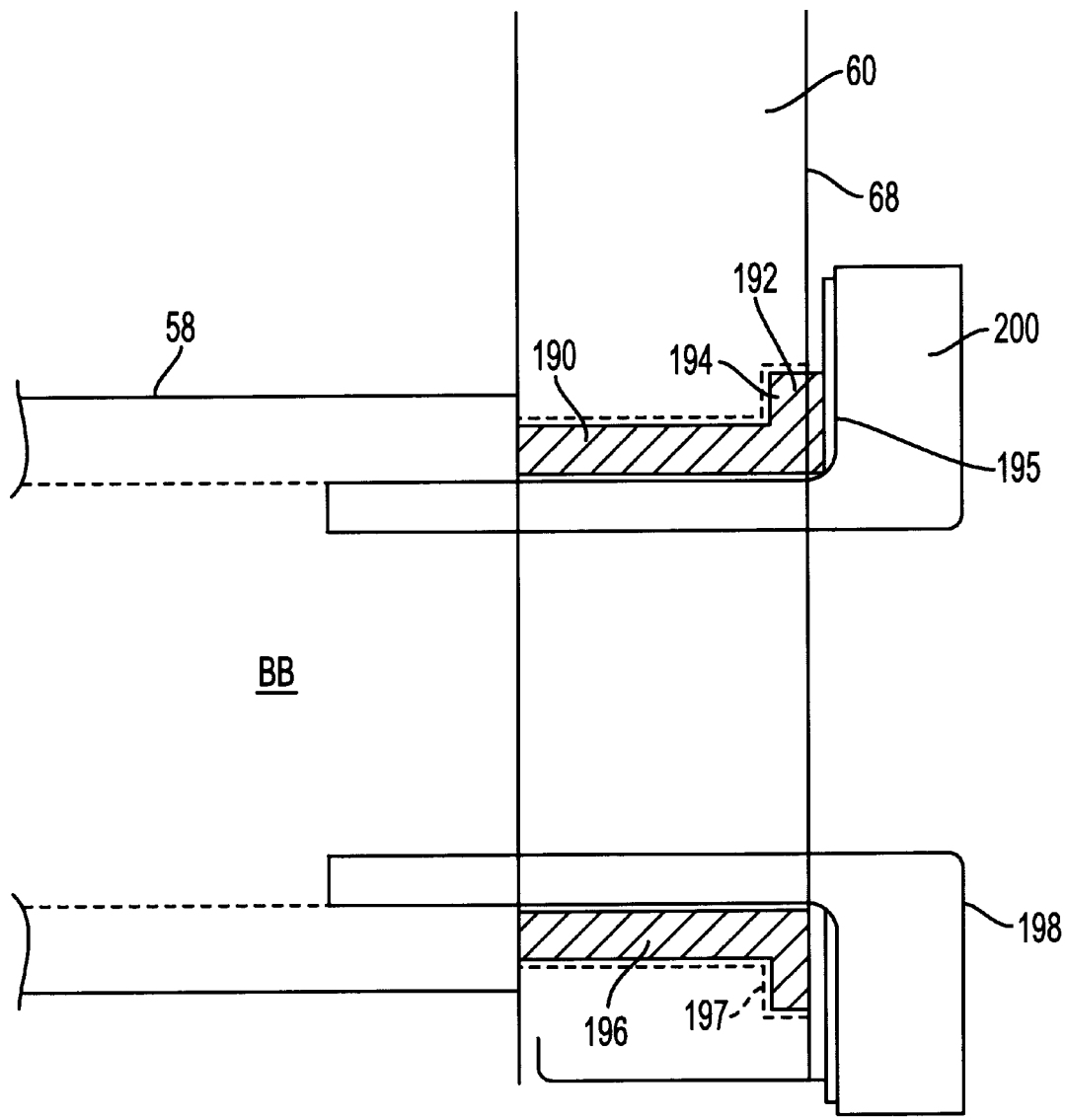
FIG. 8 is a cross sectional diagram showing how the protective plate is fastened to the bottom bracket of the bicycle.

To use protective plate 18, plate body 60 is placed so that concave surface 120 of positioning buffer 92 abuts against frame 10 and the first surface 64 of plate body 60 abuts against bottom bracket 58 with bottom bracket opening 80 aligned with the opening in bottom bracket 58. As shown in FIG. 8, a fastening ring 190 having a flange 192 with a lateral inside surface 194, a lateral outside surface 195 and a cylindrical portion 196 is fitted to plate body 60 so that cylindrical portion 196 extends through bottom bracket opening 80 and lateral inside surface 194 is lightly fitted within a groove 197 in second surface 68. A conventional bottom bracket bearing mounting cup 198 having a flange 200 is then screwed into the opening of bottom bracket 58 to retain plate body 60 to frame 10. An inner edge 199 of cylindrical portion 196 of fastening ring 190 abuts against the edge of bottom bracket 58 so that flange 200 does not apply excessive pressure to plate body 60. Thereafter, front derailleur 14 is fastened to frame 10 with the bottom surface of base member 22 abutting against the upper surface 104 of positioning abutment member 88. When the chain 38 is shifted from middle sprocket 46 to small sprocket 42, chain guiding abutment 160 prevents chain 38 from falling off small sprocket 42 should front derailleur 14 not be adjusted properly.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Positioning buffer 92 may be omitted, and bottom bracket opening 80 may have a diameter smaller or larger than the opening in bottom bracket 58 as desired. Positioning abutment member 88 and chain guiding abutment 160 need not be formed as one piece with plate body 60. Thus, the scope of the invention should not be limited by the specific structures disclosed. Instead, the true scope of the invention should be determined by the following claims.

What is claimed is:

1. A protective plate for attachment to a bicycle frame for guiding a chain comprising:

a support body having:
   a first side for facing laterally toward the bicycle frame;
   a second side for facing laterally away from the bicycle frame;
   a lower portion; and
   an upper portion;
wherein the lower portion of the first side of the support body is structured to align with a bottom bracket of the bicycle;
a positioning abutment member disposed on the upper portion of the first side of the support body; and
wherein an upper surface of the positioning abutment member forms a positioning abutment for positioning a front derailleur to the bicycle frame without forming a part of the front derailleur.

2. The protective plate according to claim 1 wherein the lower portion of the support body defines a bottom bracket opening.

3. The protective plate according to claim 2 wherein a distance between a center of the bottom bracket opening and the upper surface of the positioning abutment member is from approximately 45 millimeters to approximately 75 millimeters.

4. The protective plate according to claim 1 wherein the positioning abutment member is adjustable in a radial direction.

5. The protective plate according to claim 1 wherein the positioning abutment member forms a frame positioning member for positioning the support body on the bicycle frame.

6. The protective plate according to claim 5 wherein the frame positioning member is formed as one piece with the support body.

7. The protective plate according to claim 5 wherein the frame positioning member has a concave surface for positioning the support body on the bicycle frame, wherein the concave surface is centered relative to a vertical axis.

8. The protective plate according to claim 7 wherein the concave surface is symmetrical relative to a vertical plane extending from the vertical axis to the center of the concave surface.

9. The protective plate according to claim 8 wherein the concave surface has a semicircular shape.

10. The protective plate according to claim 7 further comprising a chain guiding abutment formed on the upper portion of the second side of the support body for guiding the chain.

11. The protective plate according to claim 10 wherein the chain guiding abutment is formed as one piece with the support body.

12. The protective plate according to claim 10 wherein the lower portion of the support body defines a bottom bracket opening, wherein the vertical axis extends through a center of the bottom bracket opening, and wherein the vertical axis is perpendicular to a horizontal axis that extends through the center of the bottom bracket opening.

13. The protective plate according to claim 12 wherein the chain guiding abutment is disposed at an angle of from approximately 45° to approximately 85° counterclockwise from the horizontal axis.

14. The protective plate according to claim 13 wherein the chain guiding abutment is disposed at an angle of approximately 66° counterclockwise from the horizontal axis.

15. The protective plate according to claim 14 wherein the chain guiding abutment extends from an angle of approximately 45° to an angle of approximately 85° counterclockwise from the horizontal axis.

16. The protective plate according to claim 15 wherein the abutment extends only from an angle of approximately 45° to an angle of approximately 85° counterclockwise from the horizontal axis.

17. The protective plate according to claim 16 wherein the chain guiding abutment is formed as one piece with the support body.

18. The protective plate according to claim 17 wherein the frame positioning member is formed as one piece with the support body.

19. The protective plate according to claim 18 wherein the chain guiding abutment has an arcuate shape.

20. The protective plate according to claim 10 wherein the second side of the support body defines a lower recess radially inwardly of the chain guiding abutment.

21. The protective plate according to claim 10 wherein the second side of the support body defines a rear recess adjacent the chain guiding abutment and extending in the counterclockwise direction.

22. The protective plate according to claim 21 wherein the rear recess has a tapered shape.

23. The protective plate according to claim 10 wherein the chain guiding abutment has an arcuate shape.

24. The protective plate according to claim 1 wherein the lower portion of the support body defines a bottom bracket opening, and further comprising a fastening ring for projecting through the bottom bracket opening and for abutting against the bottom bracket for retaining the support body to the bicycle frame.

* * * * *

UNITED STATES PATENT AND TRADEMARK OFFICE
CERTIFICATE OF CORRECTION

PATENT NO. : 6,117,032
DATED : September 12, 2000
INVENTOR(S) : Yoshiaki Nankou

It is certified that error appears in the above-indentified patent and that said Letters Patent is hereby corrected as shown below:

Column 1, Line 7, change "large" to --small--.
Column 1, Line 40, change "large" to --small--.

Signed and Sealed this

Twenty-fourth Day of April, 2001

Attest:

NICHOLAS P. GODICI

Attesting Officer

Acting Director of the United States Patent and Trademark Office